United States Patent Office 3,386,496
Patented June 4, 1968

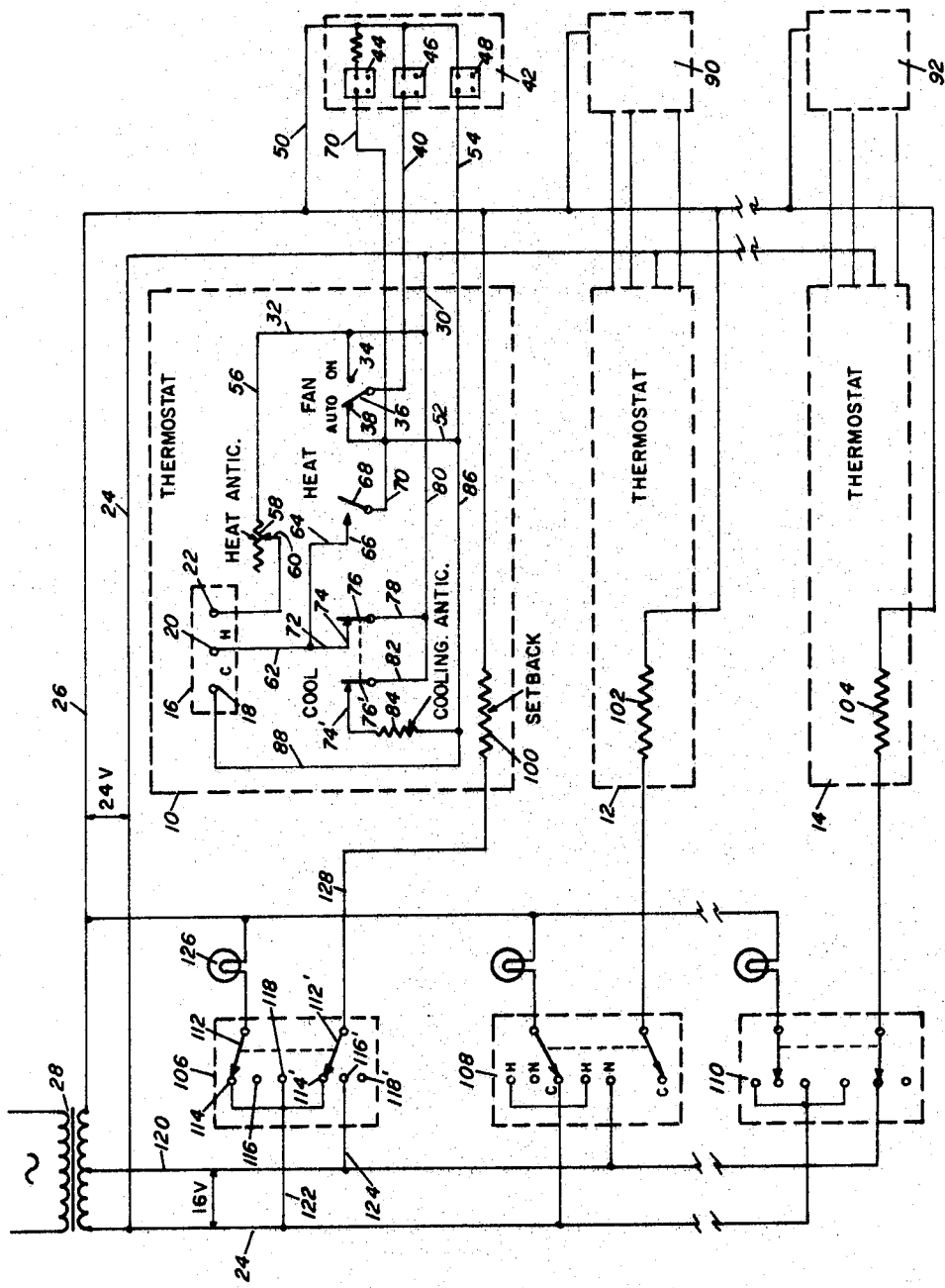

1

3,386,496
REMOTE HEATING AND COOLING TEMPERATURE SETBACK DEVICE
Thomas J. P. O'Connor, Jacksonville, Ill.
(9434 Estate Lane, Dallas, Tex. 75238)
Filed Sept. 12, 1966, Ser. No. 578,699
14 Claims. (Cl. 165—2)

ABSTRACT OF THE DISCLOSURE

A temperature control system for remote heating or cooling set back is provided. Two stages of false heat are provided at a thermostat to cause errors in the sensing of ambient temperature. The thermostat is then re-calibrated to compensate for one of the stages, whereby normal operation is obtained when one stage of false heat is applied to the thermostat. Application of two stages of false heat provides heating set back by causing the thermostat to maintain an ambient temperature below the temperature sensed by the thermostat. Removal of both stages of false heat provides cooling set back, by causing the thermostat to maintain an ambient temperature above the temperature sensed by the thermostat.

---

The present invention relates to temperature control systems, and more particularly to a system for remotely controlling the heating and cooling of a space or enclosure, whereby both heating and cooling setbacks can be selectively produced by means of control swiching which may be located at a central control point.

In hotels, schools, office buildings and the like, where there are numerous rooms individually temperature regulated, it often happens that some of the rooms are empty for irregular periods of time. For example, hotel rooms are often unoccupied between the time one guest checks out in the morning and another guest checks in in the afternoon; similarly, school rooms are often empty for a part of a day. In order to conserve on fuel, and thus to reduce the cost of heating or air conditioning these rooms, it is desirable to permit the temperature of the unoccupied room to deviate from the normally maintained, or nominal, temperature. For example, in cold weather it is desired to permit the temperature to drop, and in warm weather to let it increase above the nominal levels. In the past, this was accomplished by the simple expedient of cutting off the supply of heating or cooling, as by disconnecting the thermostat in the room to be controlled. Since it is not practical in a large building to be turning down the thermostat in each room as it becomes unoccupied, it was known practice to provide a central control panel which permitted the current supply to the individual thermostats to be switched off. This method of conserving fuel was not satisfactory, however, in that the temperature deviation in the individual rooms under these conditions could not be accurately predicted, since it was dependent upon outside weather conditions, among other things. Since it was difficult to know just how far the temperature would drop or rise during the time the thermostat was disconnected, it could not be predicted how long it would take to return the room to its normal temperature; thus the empty room could not be heated or cooled in a known period of time and this type of control was not practical.

Many years ago, a means was devised to overcome a part of this problem; a system was developed to provide heating setback. A small resistance heater was added to the thermostat in each room being controlled, and each heater was wired back to a switch at a central location. When current was applied to this heater, a false temperature reading of the room temperature was obtained by

2 the thermostat. For example, if 15° of temperature setback was desired, the heater was sized to supply an extra 15° or heat to the bimetallic temperature sensing element in the thermostat. When the heater was switched on, the thermostat would permit the actual room temperature to drop 15° below the nominal setting of the thermostat before the heating equipment would be energized. The thermostat would then maintain the room temperature 15° below the thermostat setting until the current to the resistive heater was turned off. This method of providing setback was very satisfactory when a heating cycle was required for the room being controlled; however, it has not been possible prior to the present invention to provide a similar setback for a cooling system.

With the tremendous increase in the use of air conditioning in offices, hotels and in other large buildings, the need for a cooling setback device has become more and more apparent. While many thermostats in such locations are provided with false heat in the above-described manner, no economically feasible way had been devised to supply false cooling to a thermostat and, therefore, the only method for obtaining cooling setback was to turn off the thermostat. As noted above, turning off the thermostat is not a satisfactory method of obtaining setback for on the hottest days, when the most economy can be gained by a setback system, this method cannot be used, for it would not be possible to recover the normal, or nominal, room temperature in a short enough period of time. In addition, since this approach relies directly on an interruption of current to the thermostat, additional expense is incurred in installing the unit because additional relays may be added to the air conditioning unit so that the thermostat may be operated on low voltage, or else all the wires back to the central location must be line voltage and therefore must be run in conduits in accordance with code regulations.

The present invention overcomes the difficulties of the prior art and solves the problem of cooling setback, the answers to which have long been sought in the temperature control arts. The present invention provides a method of, in effect, supplying false cooling to a thermostat to permit cooling setback. The invention does not rely on a shutdown of the thermostat to produce the desired results. but relies on the use of two stages of false heat. A heating device is installed in the thermostat and is connected to a three-position switch at a central location. The thermostat itself is then mechanically recalibrated, e.g., 15° high so that when the heater switch is in the "cooling setback," or first, position and the last occupant of the room has left the thermostat at 70°, the thermostat will not turn on the cooling system until the actual room temperature reaches 85°. When the switch is in the "normal," or second, position, the heater will supply 15° of false heat to the thermostat, thus recalibrating it to operate at the indicated nominal temperature. In this position, the system will operate either the heating or cooling system to maintain the temperature at which the thermostat is set. When the switch is in the "heating setback," or third, position, the heater will supply 30° of false heat to the thermostat so that the heating system will not be energized until the actual ambient room temperature reaches 55°.

It is therefore an object of the present invention to provide an economical, effective yet simple cooling setback for a thermostically regulated enclosure, without requiring cutoff of the current to the thermostat and without permitting the ambient temperature to vary from the nominal value more than a predetermined amount.

Another object of the invention is to provide heating and cooling setbacks in a thermostat by providing two stages of false heat to the thermostatic element.

Another object of the present invention is to provide a thermostatic system having heating and cooling setbacks as well as normal regulating operation for a plurality of rooms or enclosures, the system being controlled remotely from a central control point and each room being individually regulated.

Another object of the present invention is to provide a simple and economical method of supplying false cooling to a thermostat.

These and other objects and features of the present invention will become apparent from a study of the specification, claims and accompanying drawing, wherein is illustrated a schematic diagram of a preferred embodiment of the present invention.

Referring now to the drawing, there is illustrated three conventional room thermostats 10, 12 and 14, each designed to control both heating and cooling systems to maintain the temperature of their respective rooms at a determinable level. Thermostats 12 and 14 are similar to thermostat 10 and thus are shown only in block diagram form.

Thermostat 10 includes a mercury switch 16 mounted, e.g., on a bimetallic element for controlling the system in either its heating or cooling mode. When the system is in the cooling mode, closure of contacts 18 and 20 will activate the air conditioning, while closure of contacts 20 and 22 will activate the heating when the system is in the heating mode.

Power is supplied to the thermostat through lines 24 and 26 by way of a transformer 28 connected across a 60-cycle alternating current source which may be automatically regulated for constant voltage. The voltage appearing across lines 24 and 26 preferably is 24 volts, and thus the system is set up for use with a low voltage control heating or air conditioning unit. However, it will be noted that the thermostat could be operated on line voltage while the remote control of the temperature setback can, at the same time, be low voltage.

The power carried by line 24 is applied to thermostat 10 through line 30. This power is applied by way of conductor 32 to the "on" contact 34 of an optional fan switch 36. The fan switch is also provided with a second, "automatic," contact 38, the two switch contacts permitting either continuous operation of the heating and cooling system blower fan, or intermittent operation of the fan under the control of the thermostat. Switch 36 is connected through line 40 to the heating and air conditioning unit 42. This unit includes relays 44, 46 and 48 which control the heating system, the fan and the cooling system, respectively. Line 40 is connected through relay 46 to line 50 and thence to the power line 26, thus placing relay 46 directly across the power supply lines 24 and 26 when the fan switch is in the "on" position. Fan contact 38 is connected through line 52, line 54, relay 48 and line 50 to the power supply line 26 to complete the circuit.

Power supply line 24 is also connected through conductors 30, 32 and 56 to a heat anticipation resistor 58 having a variable tap 60 connected to mercury switch contact 22. Heat anticipation resistors such as that illustrated at 58 are, of course, well known in the thermostat art, having been described in Schaffer Patent No. 1,583,496. As is known, the anticipation resistor affects the temperature responsive means in a thermostat to prevent overrun of the system. Thus, anticipation resistors serve to open a temperature sensitive device just prior to the time that the temperature in the enclosure being regulated reaches the desired temperature, thus causing the room temperature to gradually approach and not exceed the desired temperature. The anticipation resistor 58 performs this function and anticipates the arrival of heat in the space being regulated so that the residual heat in heating system will not cause the temperature of the space to rise above the nominal value.

The central contact 20 of mercury switch 16 is connected through conductor 64 to the stationary contact 66 of the heat-selector switch 68. Switch 68, which may be a pushbutton switch to permit the occupant of the room to select the heating mode of the system is connected through line 70 to heating relay 44 and thence through line 50 to power supply line 26. Contact 20 is also connected through conductor 62 and conductor 72 to stationary contact 74 of the cooling selector switch 76. Switch 76 may also be a pushbutton switch mechanically interconnected with switch 68, and is connected through lines 78, 80 and 30 to power supply line 24. Mechanically connected to switch 76 is a similar element 76' connected through line 82 to the junction of lines 78 and 80. Element 76' cooperates with corresponding stationary contact 74' which is connected through the cooling anticipation resistor 84 and through line 86 to the junction of conductors 52 and 54. Contact 18 of the mercury switch is connected through line 88 to the junction of resistor 84 and line 86.

Cooling anticipation resistor 84 serves the usual function of cooling anticipation resistors, as described, for example, in Olson patent 2,249,223. Thus, resistor 84 compensates for the amount of cooling stored in the cooling system so as to prevent the room temperature from dropping below the desired value after the cooling apparatus has been stopped.

In operation, if it is assumed that the thermostat 10 is set in the cooling mode so that switches 76 and 76' are closed, and the ambient temperature rises to the point where a cooling operation is required, contacts 18 and 20 of mercury switch 16 will be closed by motion of the bimetallic element (not shown). This will energize cooling system relay 48 through the circuit consisting of conductors 30, 80 and 78, switch 76, contacts 74, lines 72 and 62, contacts 20 and 18, and lines 88, 86 and 54. A parallel path will be through lines 30 and 80, line 82, switch 76', contact 74', anticipation heater 84 and lines 86 and 54. The heater 84 causes the temperature at the thermostatic element to be maintained slightly above the room temperature until such time as the temperature of the space actually starts to fall and to approach the desired value, whereupon the heating effect of the anticipation resistor affects the operation of the bimetallic element to anticipate the reduction of temperature and prevent overrun. Thus the anticipation heater 84 causes the bimetallic element to open contacts 18 and 20 prematurely, thus shutting down the cooling system before the space temperature actually drops to the desired value. The residual cooling effect of the cooling system therefore will not cause the temperature to fall below the desired value.

When the thermostat is shifted over to the heating mode, with switches 76 and 76' being open and switch 68 being closed, mercury switch contacts 22 and 20 will be in the circuit comprised of line 30, conductors 32 and 56, heat anticipation resistor 58, movable contact 60, line 62 and 64, contact 66, switch 68, line 70 and heating relay 44, the relay being energized upon closure of the thermostatic contacts 20 and 22. When these contacts are closed by motion of the bimetallic element, current passes through heat anticipation resistor 58, producing heat and causing the contact 68 to open slightly before the ambient temperature would cause it to open, thus providing the desired heat anticipation.

When set for automatic operation, and the system is in the cooling mode, the fan is energized through lines 30, 80 and 78, switch 76, mercury switch 16, lines 88, 86 and 52, line 40 to the fan relay 46, and thence through line 50 to power supply line 26. When in the heating mode, the fan energizing circuit is from power supply line 24, conductors 30, 32 and 56, heat anticipating resistor 58, the mercury switch, lines 62 and 64, switch 68, lines 70 and 52, fan switch 36 and line 40 to the fan relay 46 and thence through line 50 to the power supply line 26. Thus, on automatic operation, the fan motor is energized through the heating or cooling thermostatic elements and thus is energized only when one of these elements is closed.

Each of thermostats 12 and 14 and their associated heating and air conditioning units 90 and 92 are identical to the above-described thermostat 10 and unit 42, operating in the manner described to regulate the temperature in their corresponding rooms or enclosures. Within each thermostat housing and arranged to affect the heating and cooling thermostatic element is a setback heating device 100, 102 and 104, shown here as resistors, located in thermostats 10, 12 and 14, respectively. Each of the setback resistors is connected between a corresponding selector switch 106, 108 and 110, respectively, and power supply line 26, the selector switches serving to control the current flow through the setback devices. Selector switch 106 is a three-position, double-pole switch having arms 112 and 112' mechanically connected together and arranged to come in contact with terminals 114, 116 and 118 and 114', 116' and 118', respectively. The selector switches are connected across the low-voltage output lines 24 and 120 of the secondary of power supply transformer 28, terminals 114, 118 and 114' being connected through conductor 122 to line 24 and terminal 116' being connected through conductor 124 to line 120. Switch arm 112 is connected through indicator lamp 126 to power supply line 26 and is connected to be illuminated whenever either of the heating or cooling setback is in operation. The indicator lamp is dark when the corresponding thermostat is operating in its normal, i.e., non-setback, condition. Switch arm 112' is connected through setback resistor 100 to power supply line 26, the three positions of switch arm 112' serving to apply either the full output voltage of transformer 28 across resistor 100 when at switch contact 114', a portion of the output voltage of transformer 28 when at contact 116', or no voltage when at contact 118' to provide heating setback, normal operation and cooling setback, respectively. Each of the selector switches 108 and 110 are similarly connected to their corresponding setback resistor heaters.

To operate the system, each of the thermostats 10, 12 and 14 are first calibrated in the normal manner so that the indicator means on the thermostats correspond to the nominal temperatures at which the thermostatic elements operate, i.e., when the indicator is set at 70°, the thermostatic devices will operate to maintain the room temperature at the indicated value. The thermostats are then uncalibrated by a predetermined amount, for example 15°, so that when the indicator reads 70° the thermostatic devices will operate as though the indicator was set at 85°. By uncalibrating each thermostat so that it operates 15° above its indicator setting, it then becomes necessary to supply 15° of heat to the thermostat itself to bring it back to normal operation. This is the function of the setback heating device when the corresponding selector switch is in the "normal" position. When the selector switch is in this position, the voltage appearing across lines 26 and 120 is applied to the heating device, or resistor, the resistor being selected to be of such a value that it will then produce the desired amount of heat, in this example, 15°. Thus, when switch 106 is set in the "normal" position, switch arm 112' will contact point 116' and thermostat 10 will operate in either the heating or cooling modes in the normal manner.

Heating setback may be obtained by shifting selector switch 106 to contacts 114 and 114'. This applies the voltage on lines 24 and 26 across setback resistor 100 and increases its heating output by 15°, thus providing 30° of false heat to the thermostat and causing the thermostat to operate at a temperature 30° different from that at which it would be expected to operate in its uncalibrated condition. If the thermostat is set at a nominal 70°, the bimetallic element will not close the heating contacts 20 and 22 until the actual room temperature reaches 55°. Similarly, if thermostat 10 is in its cooling mode, so that switches 76 and 76' are closed, and switch 106 is in the "normal" position to provide 15° of heat, the thermostat will operate in the usual manner to maintain the ambient room temperature at the nominal value of 70°. Cooling setback is obtained by shifting switch 106 to contacts 118 and 118', cutting off the current flow through setback resistor 100 to remove the 15° of calibrating heat and requiring the room temperature to rise 85° before the bimetallic element becomes operative to close contacts 18 and 20 of the mercury switch to turn on the air conditioning system. The thermostatic element will then maintain the room temperature at 85° until selector switch 106 is returned to the "normal" position and 15° of false heat are applied.

It will be apparent that thermostats 12 and 14 and their corresponding setback devices 102 and 104 are operated in the same manner as described above with respect to thermostat 10. It will further be apparent that any number of thermostats may be utilized in this system, that each thermostat may have a corresponding selector switch located at a central location to permit easy adjustment of the setback devices, that any desired setback temperature values can be used and that the 15° of heating and cooling setback described above more merely examples of the manner in which the system operates. If desired, differing amounts of false heat can be supplied for the cooling and for the heating setbacks without changing the principle of operation of the system. Furthermore, once the thermostats in the individual rooms have been uncalibrated by the predetermined amount, the system will operate at any nominal setting of the thermostats, providing the desired number of degrees of setback above and below the nominal value indicated on the thermostat.

Thus there has been provided a simple, reliable and inexpensive method of producing both heating and cooling setback for individual thermostats, the system providing an answer to a problem that has long existed in the temperature control arts. The system is adaptable to any type of thermostat and merely requires the addition of a heating resistor, a selector switch and the uncalibration of the thermostat to produce the desired setback operation. Although the invention has been disclosed and described in some detail, the drawings and foregoing description are to be considered as illustrative of the inventive concept and not restrictive in character, for various changes and modifications may readily suggest themselves to persons skilled in this art within the broad scope of the invention as set forth in the following claims.

I claim:

1. The method of producing cooling setback for a temperature regulating system in an enclosure comprising the steps of: sensing by means of a thermostatic element the ambient temperature of said enclosure; operating a cooling means in accordance with the sensed ambient temperature to maintain said ambient temperature at a preselected value above the nominal enclosure temperature; and energizing setback heater means to calibrate the functioning of said thermostatic element to maintain said ambient temperature at said nominal enclosure temperature, whereby de-energization of said setback heater means provides cooling setback.

2. In a control circuit for providing cooling setback in a temperature regulated enclosure, cooling means for said enclosure, a thermostat having thermostatic means for controlling said cooling means, said thermostatic means being responsive to an ambient temperature in said enclosure higher than the desired nominal value, and remotely energizable means for selectively varying the function of said thermostatic means to cause said thermostatic means to be responsive to an ambient temperature at said desired nominal value.

3. The control circuit of claim 2, wherein said remotely energizable means includes heater means located in heat transfer relationship with said thermostatic means.

4. The control circuit of claim 3, further including selector switch means for energizing and de-energizing said heater means to provide normal and cooling setback functioning of said thermostatic means, respectively.

5. The control circuit of claim 4, further including cooling anticipation means in circuit with said thermostatic means.

6. The control circuit of claim 2, further including heating means for said enclosure, said thermostat including switching means for shifting from control of said cooling means to control of said heating means, said remotely energizable means being further selectively variable to change the function of said thermostatic means to provide heating setback.

7. The control circuit of claim 6, wherein said remotely energizable means includes heater means located within said thermostat in heat transfer relationship with said thermostatic means.

8. The control circuit of claim 7, further including selector switch means for selectively energizing said heater means in two stages to provide normal and heating setback functioning of said thermostat, said selector switch further including means for selectively de-energizing said heater means to provide cooling setback functioning of said thermostat.

9. The control circuit of claim 8, further including heating anticipation and cooling anticipation means for said thermostatic means.

10. In a thermostat having selectable heating and cooling modes for regulating the temperature of an enclosure, heating means and cooling means for said enclosure; thermostatic means for regulating said heating means when said thermostat is in the heating mode and for regulating said cooling means when said thermostat is in the cooling mode; heat anticipation means for said thermostatic means for preventing heating overrun; cooling anticipation means for said thermostatic means for preventing cooling overrun; switch means for shifting said thermostat between its heating and cooling modes; and setback means in said thermostat for applying false heating and false cooling to said thermostatic means.

11. The thermostat of claim 10, wherein said setback means includes remotely controllable heater means.

12. The thermostat of claim 11, further including three-position switch means in series with a source of electric power and said heater means to regulate the current flow through said heater means to produce three levels of heat.

13. The thermostat of claim 12, wherein said thermostat is uncalibrated by a predetermined amount to cause said thermostatic means to so regulate said cooling means as to maintain the ambient temperature of said enclosure at a level higher than a selected nominal temperature when said heater means is producing a first level of heat, thus providing cooling setback.

14. The thermostat of claim 13, wherein said thermostatic means operates to regulate said heating means or said cooling means to maintain the ambient temperature of said enclosure at said selected nominal temperature when said heater means is producing a second level of heat, and wherein said thermostatic means operates to regulate said heating means to maintain the ambient temperature of said enclosure at a level lower than the selected nominal temperature when said heater is producing a third level of heat, thus providing heating setback.

References Cited
UNITED STATES PATENTS

| | | | |
|---|---|---|---|
| 2,522,286 | 9/1950 | Lehane et al. | 165—27 |
| 2,613,919 | 10/1952 | Russell et al. | 165—27 |
| 2,667,336 | 1/1954 | Lehane et al. | 165—27 |

ROBERT A. O'LEARY, *Primary Examiner.*

C. SUKALO, *Assistant Examiner.*